United States Patent [19]

Stauber

[11] Patent Number: 5,409,178
[45] Date of Patent: Apr. 25, 1995

[54] METHOD AND APPARATUS FOR WINDING AND UNWINDING PRINTED PRODUCTS IN SCALE FORMATION

[75] Inventor: Hans-Ulrich Stauber, Grüt, Switzerland

[73] Assignee: Ferag AG, Switzerland

[21] Appl. No.: 33,866

[22] Filed: Mar. 19, 1993

[30] Foreign Application Priority Data

Mar. 19, 1992 [CH] Switzerland .................. 00888/92

[51] Int. Cl.$^6$ .................. B65H 29/66; B65D 85/00; B65B 63/04
[52] U.S. Cl. .................. 242/528; 206/410; 53/118; 53/430; 242/160.4
[58] Field of Search .................. 53/118, 430, 399; 242/528, 160.1, 160.4, 59; 206/410, 412

[56] References Cited

U.S. PATENT DOCUMENTS 4,688,368 8/1987 Honegger .................. 242/59 X
4,832,273 5/1989 Honegger .................. 242/59
4,909,015 3/1990 Leo .................. 242/59 X

FOREIGN PATENT DOCUMENTS 0474999 3/1992 European Pat. Off. .
2126188 3/1984 United Kingdom .

Primary Examiner—John M. Jillions
Attorney, Agent, or Firm—McCormick, Paulding & Huber

[57] ABSTRACT

According to the invention, printed products in an imbricated or scale formation (1) are wound into a printed product roll on a roll core (2) with the aid of a winding band (3). A protective element (4) is wound onto the product roll with the aid of the same winding band (3) and as a result the printed product outermost layer (1.1) on the roll is at least partly protected against damage during the handling, transportation and storage of the roll. The protective element (4) is advantageously part of the core set, i.e. the protective element (4) is wound together with the winding band (3) onto the empty core (2), it is unwound prior to the winding up of the printed products and is wound onto the core again after unwinding the printed products. For the systematic positioning of the protective element during the winding or unwinding of the printed products, the winding station has a retrieving apparatus enabling the winding up of the protective element (4).

31 Claims, 4 Drawing Sheets

METHOD AND APPARATUS FOR WINDING AND UNWINDING PRINTED PRODUCTS IN SCALE FORMATION

BACKGROUND OF THE INVENTION

The invention is in the field of processing printed products and relates to a method and an apparatus for winding and unwinding the products in a scale or imbricated formation. With the method and apparatus according to the invention printed products in scale formation are wound into and unwound from printed product rolls which can be easily handled, transported and stored without any risk of damaging said printed products.

According to the prior art printed products and also other flat articles, which are obtained from production or further processing, e.g. from a rotary press and in the form of a series of imbricated products, are wound up to form rolls or reels for intermediate storage or production buffering. This is e.g. carried out in accordance with U.S. Pat. Nos. 5,176,333 and 5,158,242 of the same Applicant by the winding stations, in that the series of products is wound with the aid of a winding band onto a roll or reel core or hub. One end of the winding band is firmly connected to the roll core and said band is wound onto the empty core. For winding purposes an empty core with winding band is placed on a winding station with a winding configuration and the winding band is wound onto an intermediate roll from the said core. The series of printed products is then wound with the winding band onto the core. The winding band keeps the printed products firmly secure in central manner on the roll and normally has a much smaller width than the printed products. Such a printed product roll is then removed from the winding station, transported away and intermediately stored. If the printed products are required again for further processing, the rolls are collected from the storage location, placed on winding stations having an unwinding configuration and are then unwound. During the unwinding the winding band is again unwound on the intermediate roll and when all the printed products have been unwound it is wound back onto the empty core.

Specifically in the case of printed products made from soft paper and having a relatively large number of pages, it has been found that the winding band strongly draws the products centrally against the core and the outer portions and in particular the corners located on the outside of the roll, project without much stability from the roll surface and are damaged or deformed with considerable ease during handling, transportation and storage. This printed product roll disadvantage can be obviated in that such products are wound in a very confined or tight series, i.e. with a very small product spacing and thick roll layers. However, the aforementioned disadvantage is not obviated in the end region of the wound series, where the roll layer becomes successively thinner.

The same problem also occurs when winding double folds, which have a fold on one face of the roll and a bloom or head on the other. At particular risk are the product corners, over the entire outer circumference of the roll, which have at the front on the roll a fold, which is applied more radially to the roll than the rest of the product. Such rolls are e.g. obtained if preliminary products for telephone directories are wound.

The problem of the invention is to provide a method enabling printed products in imbricated formation to be wound and unwound, it being possible to produce rolls with large diameters and the most varied printed products, which also in the outermost layer of the roll and specifically in the vicinity of the end of the wound series are better protected against deformation and damage at the time of handling, transportation and storage. A further problem of the invention is to provide a winding station and a corresponding core set for performing the method.

SUMMARY OF THE INVENTION

According to the invention during winding, over the outermost layer of printed products or at least over part of said outermost layer, a protective element is wound onto the roll with the aid of the winding band. The protective element is strip-like and comprises a windable material, e.g. a plastic sheet, which has a stability such that it can press the printed products against the winding core against the radially acting, deforming forces and is at most elastically deformed. The protective element is wider than the winding band and is at most of the same width as the wound printed products. As a function of its application, its length is adequate in order to cover the end region of the wound series or the entire outermost circumferential surface of the roll.

The protective element has two functions, namely it prevents an undesirably pronounced curvature of the printed products away from the core and it also provides a mechanical protection for the circumferential surface of the roll or for at least part of it.

The protective element is advantageously part of the core set which, according to the prior art comprises the core and the winding band, and which according to the method of the invention is extended by the protective element. Thus, the winding method according to the invention e.g. takes place in the following way. The core set (core with winding band and protective element) is placed on a winding station. The winding band and the protective element are unwound from the core. The series of printed products is wound with the winding band onto the core. When the roll has reached its size, the protective element is wound around the roll and the roll is terminated with the band lock. The roll is removed from the winding station and intermediately stored. The roll is placed for further processing on an unwinding station. Firstly, with a first part of the winding band the protective element is unwound and then further winding band and the series of products is unwound. The winding band and the protective element are wound onto the core and the core set is removed from the unwinding station.

BRIEF DESCRIPTION OF THE DRAWINGS

The method and apparatus according to the invention are described in greater detail hereinafter relative to the drawings as follows.

DESCRIPTION OF THE PREFERRED EMBODIMENTS

Figure 1A:
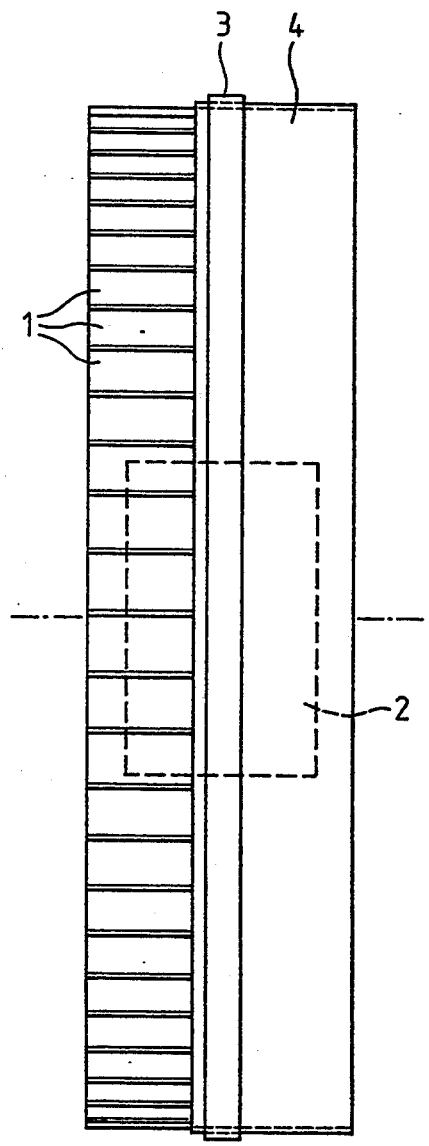
FIGS. 1a and 1b—A printed product roll protected according to the method of the invention as viewed perpendicular to the roll axis (FIG. 1a) and as viewed in fragmentary form parallel to the roll axis (FIG. 1b).
Figure 1B:
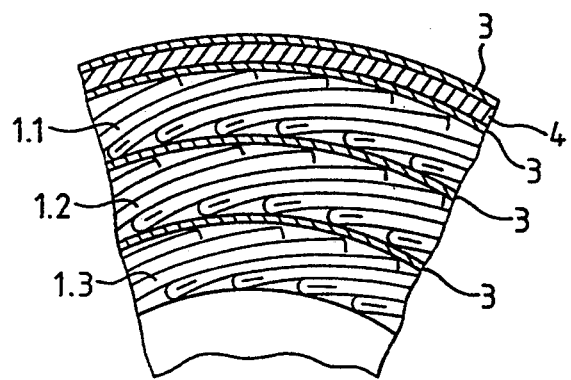

FIGS. 1a and 1b show a printed product roll which is protected according to the method of the invention, as viewed perpendicular to the roll axis (FIG. 1a) and parallel to the roll axis (FIG. 1b). The roll has a series of imbricated printed products 1, which are wound spirally onto 9 roll core 2 in the form of layers 1.1, 1.2 etc. The layers are kept on the roll by a winding band 3. As can be gathered from the sectional representation of FIG. 1b, each printed product layer 1.1, 1.2, 1.3 etc. is held by the winding band 3 against the core 2. Over the outermost layer 1.1 of printed products and specifically in the vicinity of the end of the series and the band area securing it, also held on the roll by the winding band 3, the protective element 4 is wound onto the roll.

The protective element 4 of the exemplified embodiment shown is narrower than the wound printed products 1 and extends on one side away from the winding band 3. Such a one-sided protection, which surrounds the entire roll, is advantageous for rolls of double-folded products, which have on one face of the roll a fold and on the other side the bloom and whereof, as stated, in particular the fold side is exposed and requires protection. However, the protective element can extend in the same way on both sides of the winding band and can have the same width or can be narrower than the printed products.

Figure 2:
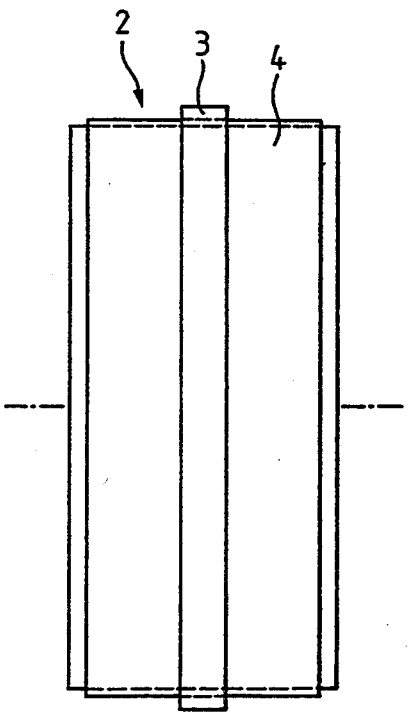
FIG. 2—A winding core set according to the invention.

Once again as a view perpendicular to the axis, FIG. 2 shows an empty core set comprising the core 2 and the winding band 3 and protective element 4 wound onto it. Only if the protective element 4, if wound onto the core, does not project over the core 2 in the axial direction, is it possible without any difficulty to handle and transport the core set, the protective element width being limited upwards. As often the printed products are wider than the core (also in FIG. 1), and also wider than the protective element, but as the printed product areas against the faces of the roll are particularly at risk, it is preferable to have a one-sided arrangement of the protective element on the printed products with respect to the winding band, as has already been shown and described in conjunction with FIG. 1.

It has been found that protective elements in the form of strip-like plastic sheets can be wound without difficulty onto the winding cores described in the aforementioned U.S. Pat. Nos. 5,176,333 and 5,158,242 of the same Applicant. A protective element e.g. has a length of 0.2 to 8 m and a width of 0.2 to 0.5 m. For standard rolls used in connection with the further processing of printed products having a diameter of 1.8 to 2.5 m, an 8 m long protective element permits e.g. a one to one and a half times winding around the roll, so that the outermost roll layer is fully protected.

FIGS. 3a to 3d or 4a to 4d show relative to an exemplified embodiment of the winding station, the method according to the invention namely for winding (producing) a roll (FIG. 3) and for unwinding (FIG. 4). Only those parts relevant for the method of said winding station are shown. For a more detailed description reference is e.g. made to the aforementioned U.S. patents. The drawings show the winding core 2, the winding band 3, the protective element 4 and a conveying element 5, e.g. in the form of a conveyor belt, for the series of imbricated printed products. The winding core 2 is applied to the winding station on a lifting device (not shown) in such a way that in its lowest position it is located directly above the conveying element 5, whereas in its highest position it is above said conveying element at least by the radius of the finished roll. The drawings show a first retrieving apparatus 6 for the systematic guiding and positioning of that area of the winding band 3, which is not rolled onto the core 2 or the roll, as well as a second retrieving apparatus 7 for the systematic positioning of the protective element 4, when it is not wound onto the core 2 or a roll.

The first retrieving apparatus 6 e.g. has a separating roll 61, which is made from iron and cooperates with one winding band end, which is provided with a magnet, whilst there is also a band guide 62 and a driven band roll 63. Further embodiments of the first retrieving apparatus 6 have already been described in the aforementioned U.S. patents.

The second retrieving apparatus 7 e.g. comprises a protective element roll 71, which is positioned on a lever 72 freely rotatable over the conveying element 5. The lever 72 is located on a stationary machine part (not shown) in such a way that the protective element roll 71 can assume two positions. It is either located on the conveying element 5 and is pressed onto it at least by its own weight or by an additional spring tension, so that it is driven by the conveying element, or it is positioned in spaced manner above the conveying element 5. The lever can also be positioned in such a way that the protective element roll 71 is perpendicular to the paper plane of the drawings, i.e. parallel to the rotation axis of a core or roll applied to the winding station. Further exemplified embodiments of the second retrieving apparatus 7 will be described in conjunction with FIGS. 5, 6 and 7.

Figure 3A:
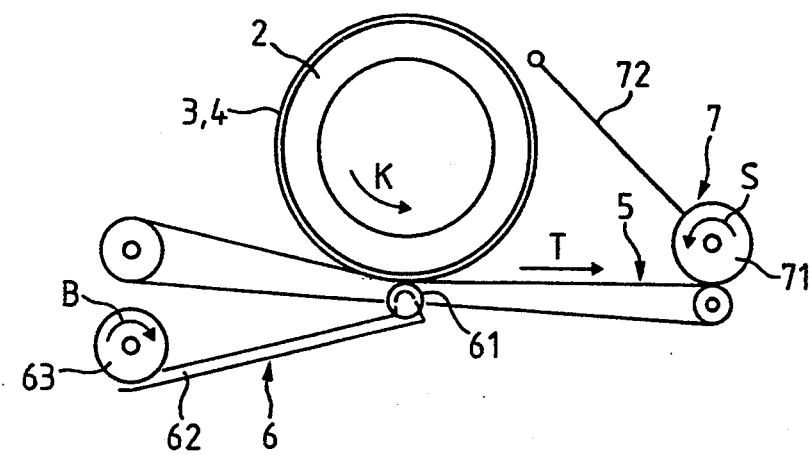
FIGS. 3a to 3d—A sequence of diagrammatic views showing portions of the winding station according to the invention for illustrating the winding process.

FIGS. 3a to 3d illustrate the winding process. A core set comprising a core 2 and the winding band 3 and protective element 4 wound onto it is placed on the winding station and brought into its lowest position (FIG. 3a). The core 2 is driven in the direction of the arrow K, the band roll 63 in the direction of the arrow B and the conveying element 5 in the direction of the arrow T. The protective element roll 71 is in its lowered position and engages on the conveying element 5, so that it is driven by the latter in the direction of the arrow S. If the free end of the winding band, which is e.g. provided with a magnet, passes the separating roll 61, it is peeled from the core 2 and moved into the band guide 62. Through the further rotation of the core 2 the band end is guided against the band roll 63 and finally the band 3 is wound onto the latter. When the part of the winding band 3 projecting over the protective element 4 is unwound from the core 2, the start of the protective element 4 meets the conveying element 5, is conveyed by the latter against the protective element roll 71 and is wound onto the latter.

Figure 3B:
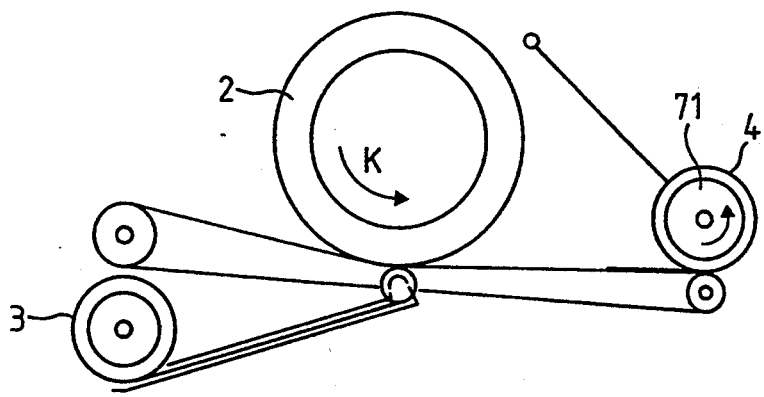

FIG. 3b shows the winding station shortly before the protective element 4 has been unwound from the core. When the winding band 3 has been sufficiently unwound, the drives are stopped and the protective element roll 71 is brought into its position raised above the conveying element. If the protective element 4, which has been centrally rolled onto the core, is to be wound on the roll asymmetrically to the winding band 3 (as described in conjunction with FIG. 1), prior to the winding of a series of printed products the position of the protective element roll 71 must be displaced parallel to the axis of the mounted core.

Figure 3C:
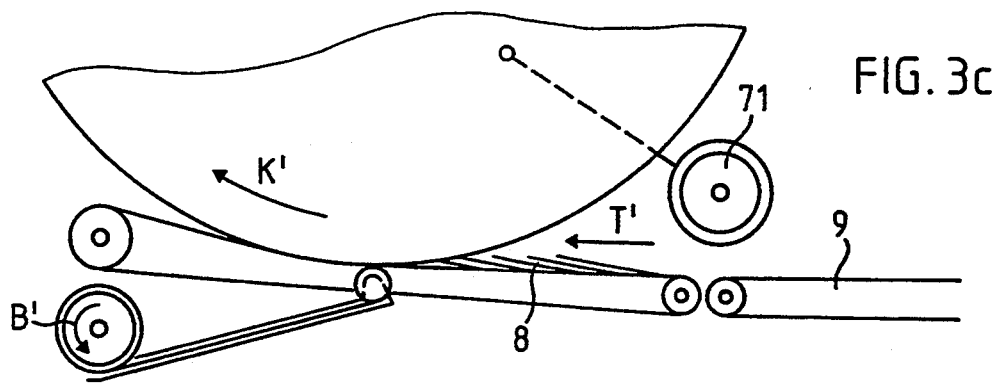

It is now possible to pass a series of imbricated printed products 8 onto the conveying element 5, which now operates in the reverse direction T', e.g. by means of an inwardly pivoted, further conveying element 9. As soon as the series of products 8 has reached the core 2, it is wound with the band 3 onto the core 2 (FIG. 3c). The winding band 3 is unwound from the more slowly rotating band roll 63 and the roll core 2 is constantly raised in such a way that the conveying element 5 always represents a tangent on the growing roll.

When the roll has an adequate circumference, supply is stopped. The protective element roll 71 is lowered against the conveying element and driven by the latter in the direction of the arrow S', in such a way that the protective element is unwound and conveyed on the conveying element against the roll and is wound onto the latter with the remainder of the winding band.

Figure 3D:
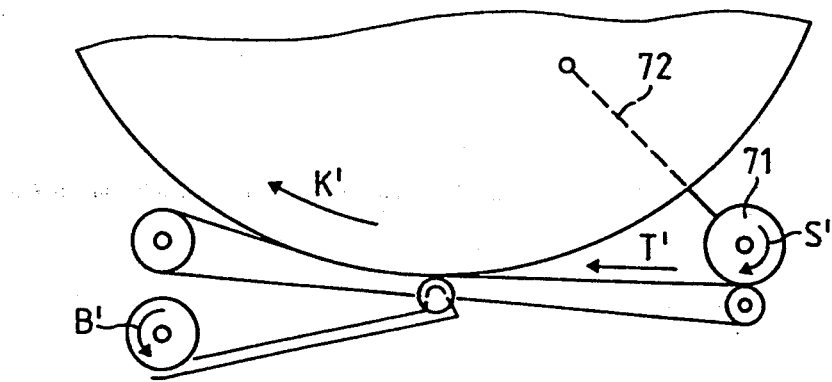

FIG. 3d shows the winding station with the finished roll. The lowering of the protective element roll must be controlled in such a way that, if the protective element has been completely wound onto the roll, the free band end projects over it at least to such an extent that it can be fixed to a lower band portion and consequently the roll becomes a handlable and transportable unit.

Figure 4A:
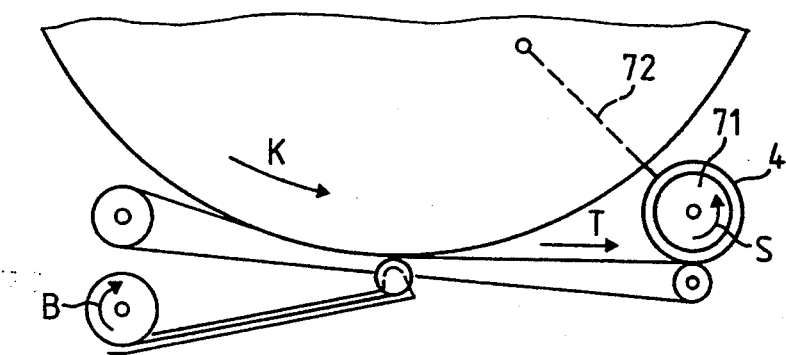
FIGS. 4a to 4d—A sequence of views similar to FIGS. 3a to 3d, but for the unwinding process.
Figure 4B:
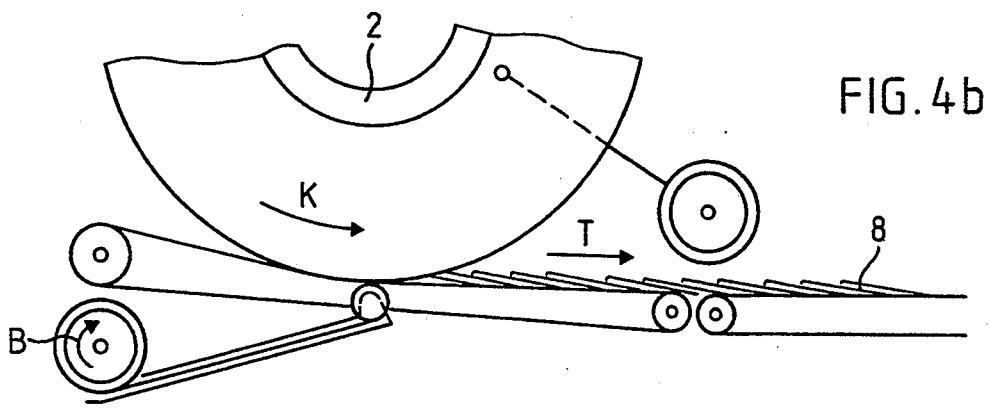
Figure 4C:
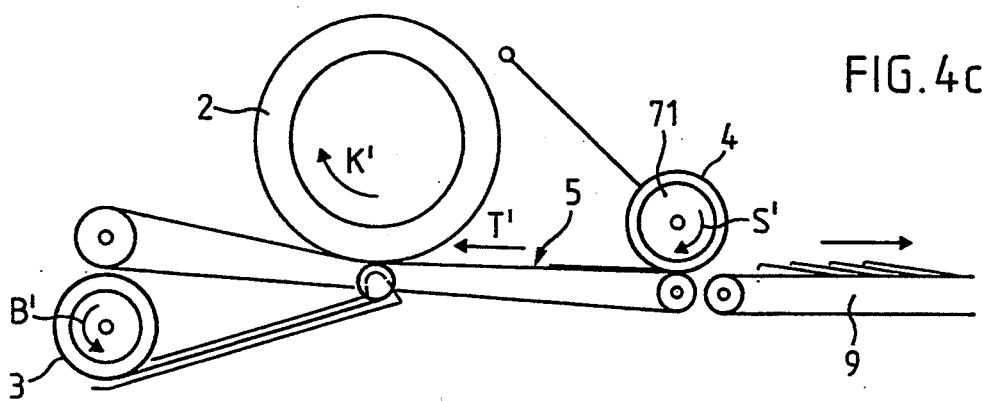
Figure 4D:
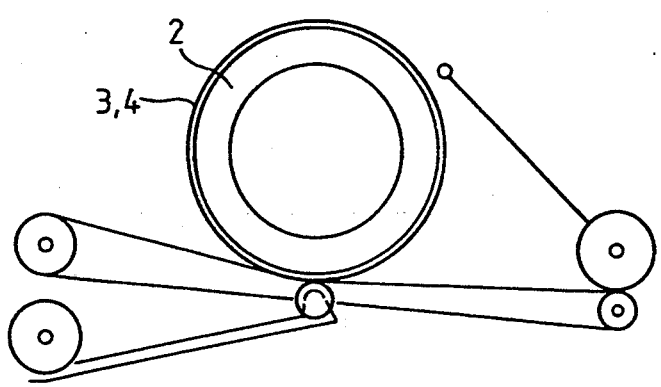

FIGS. 4a to 4d show the unwinding process, which takes place in the reverse direction to the winding process. In FIG. 4a, from the full roll is firstly unwound the area of the free end of the winding band 3 and then the protective element with further band areas. This process takes place in the same way as the unwinding of the band 3 and the protective element 4 from the core 2 (FIG. 3a) with the difference that now the protective element 4 is wound on closer to the free band end. Immediately following the protective element 4, the series of printed products 8 is unwound and for this purpose the protective element roll 71 is lifted away and e.g. the further conveying element 9 is pivoted in (FIG. 4b). If the protective element 4 was wound from the winding band 3 on the roll, the axial position of the protective element roll 71 for the winding of the protective element 4 onto the core is adjusted. As soon as all the printed products have been unwound, by lowering the protective element 71 and driving the core 2 or the conveying element 5 in the direction K' or T' the protective element 4 and winding band 3 are again wound onto the core (FIG. 4c). FIG. 4d shows the core set ready for removing from the station, said core set comprising the core 2, as well as the wound on winding band 3 and protective element 4.

The protective element wound onto the protective element roll must be secured thereto in such a way that during the movements of said roll it is not displaced, unwound or loosened. In the case of a single roll as shown in FIGS. 3 and 4, this can be achieved with a protective element made from a material which sticks to itself. However, it can also be brought about with retrieving apparatuses, as shown e.g. in FIGS. 5, 6 and 7.

Figure 5:
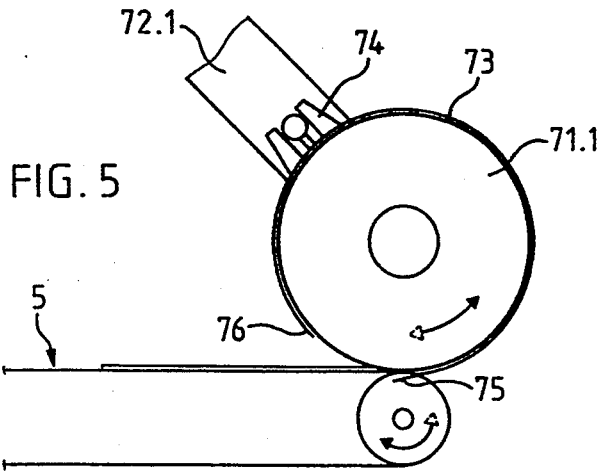
FIGS. 5 to 7—Exemplified embodiments of the retrieving apparatus for the systematic positioning of the protective element.

FIG. 5 shows an exemplified embodiment of the retrieving apparatus for the systematic positioning of the protective element. It has a freely rotatable protective element roll 71.1 positioned on a rocking or pivoted lever 72.1. A resilient clasp 73 at least partly skirts round the protective element roll 71.1 and completely and firmly surrounds the latter and is positioned in such a way that said roll is free where it is driven by the conveying element 5. The clasp 73 is so positioned in a guide 74 on the pivoted lever 72.1, that it can adapt to the protective element roll diameter increasing as a result of the wound on protective element. With the edge 75 directed against the conveying element the clasp 73 simultaneously fulfils the function of guiding the protective element during winding on and around the protective element roll and presses it against said roll. The opposite edge 76 can fulfil the function of peeling off the protective element for unwinding from the roll 71.1.

Figure 6:
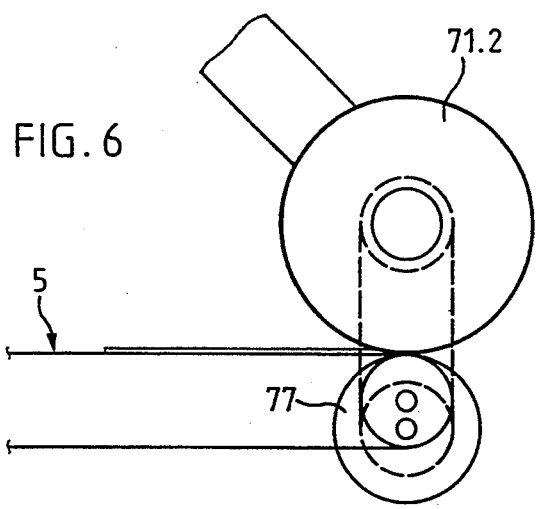

FIG. 6 shows another embodiment of the same retrieving apparatus as in FIG. 5. It once again has a protective element roll 71.2 for winding up the protective element and an auxiliary roll 77 connected thereto. Both rolls 71.2 and 77 are driven by the conveying element 5 in the non-raised position. A winding band is fixed at one end to the protective element roll 71.2 and at the other end to the auxiliary roll 77 and is wound onto the latter if no protective element is wound on. If a protective element is wound onto the protective element roll 71.2, the band is also wound by the auxiliary roll 77 and keeps the protective element firmly on the protective element roll 71.2, in the same way as the series of printed products is held by a winding band on the roll core. If the protective element is unwound again, the band is wound onto the auxiliary roll 77.

Figure 7:
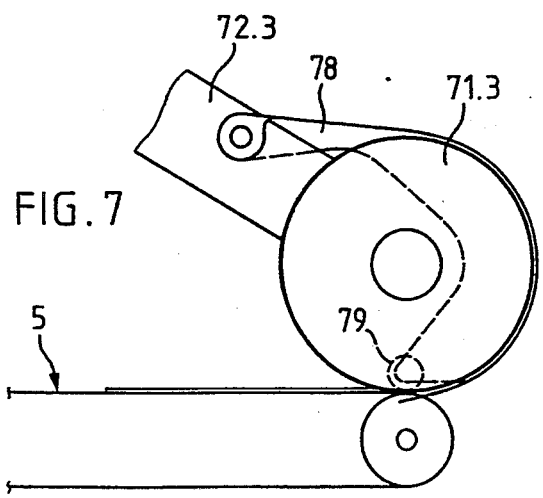
Figure 8D:

FIG. 7 shows another embodiment of the same retrieving apparatus as in FIGS. 5 and 6. It once again has a protective element roll 71.3, which is arranged in freely rotatable manner on a pivoted lever 72.3. A curved clip 78 is also pivotably positioned on said pivoted lever 72.3 and curves on one side round the protective element roll 71.3 and in the vicinity of its lowest point carries a small supporting roll 79. If the protective element roll 71.3 is in its lowered position, then the clip 78 is supported by the supporting roll on the conveying element 5 and is consequently slightly raised from the protective element roll 71.3 (as shown in the drawing). If the protective element roll 71.3 is in its raised position, the clip 78 is not supported and consequently, at least at the top rests on the protective element roll 71.3 and consequently presses the wound protective element against said roll.

All the shown embodiments of the retrieving apparatus 7 have protective element rolls, which are driven by the conveying element and for this purpose must be lowered onto the same. However, it is also conceivable for the protective element roll to have its own controllable drive.

The retrieving apparatus 7 for the systematic positioning of the protective element can, in place of the protective element roll, have a different protective element positioning means. It is conceivable to have a channel, in which the protective element extends or is positioned in folded undulating manner, or to e.g. have a magnetic hanging arm, which is lowered against the conveying element, so as to grip an end of a protective element provided with a steel strip and is then raised to such an extent that the protective element hangs freely thereon.

Figure 8A:
FIGS. 8a to 8d—Exemplified embodiments of the protective element.
Figure 8B:
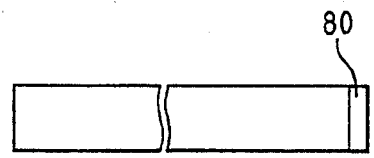
Figure 8C:
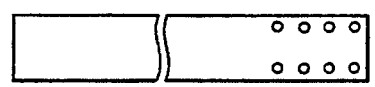

FIGS. 8a to 8d show different embodiments of protective elements. A protective element can be a single, striplike plastic sheet piece or a piece of a similar material (FIG. 8a). In order to be able to wind such a protective element onto a protective element roll, the roll must be equipped with means for guiding the protective element end against the roll, e.g. a leading edge 75 (FIG. 5). The protective element end can also be specifically equipped for interacting with the protective element roll. For example, said end piece can have a magnet 80, which cooperates with an at least partly iron roll (FIG. 8b), or it can be perforated and cooperate with a roll equipped with corresponding drivers (FIG. 8c). The complete protective element can also contain steel or magnetic strips 81 and can cooperate with a roll equipped with driving magnets.

In all the embodiments described up to now the same protective elements can always be reused for new rolls. They form a part of the core set and are also used whenever the core is used for a roll. In this way the method is very economic. However, it is also conceivable for the protective element to be a disposable part and for the protective element roll to be in the form of a storage roll, on which is wound a supply of the corresponding material, e.g. strong paper with the correct width. Onto each roll is then wound a piece of said material and is cut with the correct length by means of a correspondingly controlled cutting mechanism. The protective element is then discarded on unwinding the roll.

I claim:

1. Winding station for winding and unwinding a series of printed products comprising conveying means (5) for conveying in opposite directions printed products in imbricated formation; a retrieving apparatus (6) for guiding and positioning a winding band between layers of imbricated products wound onto a core; and a further retrieving apparatus (7) guiding a protective element (4) between the winding band and an outer layer of printed products and positioning the protective element (4) relative to the wound printed products.

2. Winding station according to claim 1, characterized in that the further retrieving apparatus (7) has a protective element roll (71) rotatably supported and carrying the protective element (4).

3. Winding station according to claim 2, characterized in that the protective element roll (71) is fitted to the station in a freely rotatable, displaceably driven manner in such a way that it rests on the conveying means (5) and is raised therefrom.

4. Winding station according to claim 2, characterized in that the protective element (71) is spaced from the conveying means (5) and is driven in controlled manner.

5. Winding station according to claim 2, characterized in that the protective element roll (71) is applied to the station in such a way that it is displaceably driven parallel to the axis of a roll or core engaged at the winding station.

6. Winding station according to claim 2, characterized in that the protective element roll (71) is located on a lever (72) pivotably placed at the station.

7. Winding station according to claim 2, characterized in that the protective element roll (71.1) is surrounded by an elastic clasp (73) in such a way that the clasp (73) is arranged with a guide (74) at the station so that the clasp position is variable to a limited extent with respect to the roll (71.1).

8. Winding station according to claim 2, characterized in that the further retrieving apparatus (7) has a protective element roll (71.2), an auxiliary roll (77) and a second winding band, one end of the second winding band being fixed to the protective element roll (71.2) and the other end of the second winding band being fixed to the auxiliary roll (77).

9. Winding station according to claim 2, characterized in that a curved clip (78) is arranged at least partially around the protective element roll (71.3) and pivotal with respect thereto in such a way that when said roll (71.3) is lowered onto the conveying element (5) it is supported on a supporting roll (79) on the conveying means (5) and in the raised position rests on the protective element roll (71.3).

10. Winding station according to claim 1, characterized in that the further retrieving apparatus (7) has a storage roll for protective element material and a cutting mechanism for cutting the protective element material from the storage roll.

11. Roll core set for winding and unwinding a series of printed products in imbricated formation comprising a core, a winding band for securing the printed products on the core and a protective element (4) wound with the winding band (3) onto the core (2).

12. Roll core set according to claim 11, characterized in that the protective element is flat and strip-like and at the most as wide as the circumferential surface of the core and shorter than the winding band.

13. Roll core set according to claim 11, characterized in that the protective element is a plastic sheet.

14. Roll core set according to claim 11, characterized in that the protective element is provided with a magnet (80) at one end.

15. Roll core set according to one of the claims 11 to 13, characterized in that the protective element has a perforated pattern at one end.

16. Roll core set according to claim 11, characterized in that the protective element is provided with steel or magnetic strips (81).

17. A method of processing printed products in an imbricated formation on a core, comprising the following steps:
    winding the printed products in imbricated formation in layers onto the core;
    winding a band under tension between layers of imbricated products and pressing the layers inwardly toward the core; and
    winding a protective element between the band and an outer layer of imbricated products and pressing the underlying portion of the outer layer inwardly with the band toward the core to substantially prevent deformation and damage to the underlying portion of the outer layer.

18. A method as defined in claim 17, further comprising the steps of winding the band and protective element onto the core prior to winding the printed products onto the core, and then unwinding the band and protective element from the core in order to wind printed products onto the core.

19. A method as defined in claim 17, further comprising the steps of unwinding the free ends of the band and protective element from the core, unwinding the printed products with the band from the core, and upon removing the printed products from the core, winding the band and protective element back onto the empty core.

20. A method as defined in claim 19, further comprising the steps of upon unwinding the band and protective element from the core, winding the band onto a band roll and positioning the protective element relative to the core so that upon rewinding the band and protective element onto the core the protective element is overlying the core.

21. A method as defined in claim 20, wherein during the step of positioning the protective element relative to the core the protective element is wound onto a protective element roll.

22. A method as defined in claim 17, further comprising the step of winding the protective element onto the outer layer of printed products in an asymmetric position relative to a median plane of the winding of printed products oriented substantially perpendicular to an axis of the winding.

23. A method as defined in claim 17, further comprising the step of winding the protective element onto the outer layer of printed products in a symmetric position relative to a median plane of the core oriented substantially perpendicular to an axis of the core.

24. A method as defined in claim 17, further comprising the steps of unwinding a predetermined length of the protective element from a supply roll and cutting the predetermined length from the supply roll for winding between the band and the outer layer of printed products.

25. A winding station for winding printed products in an imbricated formation onto a winding core, comprising:
   a rotatably supported winding core;
   means for conveying an imbricated formation of printed products toward the winding core;
   means for guiding a winding band under tension to the winding core and for winding the tensioned band between layers of imbricated product onto the core; and
   means for winding a protective element between the band and an outer layer of imbricated products to press the underlying portion of the outer layer inwardly with the band toward the core and substantially prevent deformation and damage to the underlying portion of the outer layer.

26. A winding station as defined in claim 25, wherein the means for winding a protective element includes a protective element roll carrying the protective element and for discharging the protective element between the band and imbricated products.

27. A winding station as defined in claim 26, further comprising means for driving the protective element roll between a first position in engagement with the means for conveying imbricated products to rotatably drive the protective element roll and a second position spaced away from the means for conveying.

28. A winding station as defined in claim 26, further comprising means for driving the protective element roll in a direction substantially parallel to an axis of the core for selectively positioning the protective element with respect to the imbricated products.

29. A winding station as defined in claim 26, further comprising a lever carrying the protective element roll and pivotably supported on the station for moving the roll between a first position in engagement with the conveying means for rotatably driving the roll upon rotation of the conveying means and a second position spaced away from the conveying means.

30. A winding station as defined in claim 26, further comprising a resilient retaining member engaging and partially surrounding the protective element roll, the retaining member defining an aperture for the passage of protective element therethrough and being adjustable in size to accommodate changes in diameter of the protective element roll.

31. A winding station as defined in claim 26, further comprising a curved retaining member pivotally mounted adjacent to the protective element roll and defining an opening for the passage of protective element therethrough, the curved retaining member being moveable between a first position in engagement with the protective element roll and a second position spaced away from the protective element roll.

* * * * *